US012377708B2

(12) United States Patent
Jiang et al.

(10) Patent No.: US 12,377,708 B2
(45) Date of Patent: Aug. 5, 2025

(54) FLUID MANAGEMENT DEVICE AND THERMAL MANAGEMENT SYSTEM

(71) Applicant: ZHEJIANG SANHUA AUTOMOTIVE COMPONENTS CO., LTD., Zhejiang (CN)

(72) Inventors: Zhengang Jiang, Zhejiang (CN); Yong Xu, Zhejiang (CN); Zhenwen Chen, Zhejiang (CN); Yao Guo, Zhejiang (CN); Han Jiang, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 185 days.

(21) Appl. No.: 18/282,707

(22) PCT Filed: Mar. 18, 2022

(86) PCT No.: PCT/CN2022/081627
§ 371 (c)(1),
(2) Date: Sep. 18, 2023

(87) PCT Pub. No.: WO2022/194270
PCT Pub. Date: Sep. 22, 2022

(65) Prior Publication Data
US 2024/0157759 A1 May 16, 2024

(30) Foreign Application Priority Data

Mar. 19, 2021 (CN) .......................... 202110294430.9
Mar. 19, 2021 (CN) .......................... 202110294444.0

(51) Int. Cl.
F25B 41/20 (2021.01)
B60H 1/00 (2006.01)
(Continued)

(52) U.S. Cl.
CPC ..... *B60H 1/00485* (2013.01); *B60H 1/00278* (2013.01); *B60H 1/00885* (2013.01);
(Continued)

(58) Field of Classification Search
CPC ............ B60H 1/00485; B60H 1/00278; B60H 1/00885; B60H 1/3229; F25B 41/20;
(Continued)

(56) References Cited

U.S. PATENT DOCUMENTS

2019/0107014 A1   4/2019   Smith
2022/0194167 A1   6/2022   Morimoto et al.
2022/0268364 A1   8/2022   Geng

FOREIGN PATENT DOCUMENTS

CN   109520176 A   3/2019
CN   109653824 A   4/2019
(Continued)

OTHER PUBLICATIONS

International Search Report for PCT/CN2022/081627 mailed Jun. 21, 2022, ISA/CN.
(Continued)

*Primary Examiner* — Jonathan Bradford
(74) *Attorney, Agent, or Firm* — Yue (Robert) Xu

(57) ABSTRACT

A fluid management device and a thermal management system are provided. The fluid management device includes a fluid management module, a connecting member and a fluid management component, wherein the fluid management module is fixedly or limitedly connected to the connecting member; at least part of the fluid management component is located in a mounting hole; the fluid management device has a communicating channel, at least part of which is located in the connecting member; the communicating channel includes a first communicating channel being in communication with a first valve cavity of a first fluid
(Continued)

management module, and a second communicating channel including a first sub-channel, a second sub-channel being in communication with a second valve cavity of a second fluid management module, and a third sub-channel. The opening degree of the second communicating channel can be adjusted by the fluid management component.

20 Claims, 9 Drawing Sheets

(51) Int. Cl.
  *B60H 1/32* (2006.01)
  *F25B 41/40* (2021.01)
(52) U.S. Cl.
  CPC ........... *B60H 1/3229* (2013.01); *F25B 41/20* (2021.01); *F25B 41/40* (2021.01)
(58) Field of Classification Search
  CPC ........ F25B 41/30; F25B 41/325; F25B 41/40; F25B 41/31; F25B 43/00; F25B 2500/18
  See application file for complete search history.

(56) References Cited

FOREIGN PATENT DOCUMENTS

| | | |
|---|---|---|
| CN | 109838585 A | 6/2019 |
| CN | 109838586 A | 6/2019 |
| CN | 109838587 A | 6/2019 |
| CN | 112128408 A | 12/2020 |
| CN | 112129000 A | 12/2020 |
| CN | 112428772 A | 3/2021 |
| CN | 112443679 A | 3/2021 |
| WO | 2020259398 A1 | 12/2020 |
| WO | 2021048095 A1 | 3/2021 |
| WO | 2021049435 A1 | 3/2021 |

OTHER PUBLICATIONS

European search report mailed on Feb. 11, 2025 for 22770622.3.
The 1st Office Action regarding Chinese Patent Application No. CN202110294430.9, Mailing date: Jan. 25, 2025. English Translation Provided by http://globaldossier.uspto.gov.

FLUID MANAGEMENT DEVICE AND THERMAL MANAGEMENT SYSTEM

The present application is the national phase of International Application No. PCT/CN2022/081627, titled "FLUID MANAGEMENT DEVICE AND THERMAL MANAGEMENT SYSTEM", filed on Mar. 18, 2022, which claims priority to Chinese Patent Application No. 202110294430.9, titled "FLUID MANAGEMENT DEVICE FOR ELECTRONIC OIL PUMP", filed on Mar. 19, 2021, and Chinese Patent Application No. 202110294444.0, titled "FLUID MANAGEMENT DEVICE AND THERMAL MANAGEMENT SYSTEM", filed on Mar. 19, 2021, with the China National Intellectual Property Administration, which are incorporated herein by reference in its entirety.

FIELD

The present application relates to the technical field of fluid management, and in particular to a fluid management device and a thermal management system.

BACKGROUND

A thermal management system includes some functional components. These functional components are arranged in different positions, in other words, these functional components are distributed in different positions of the thermal management system. The functional components are required to be connected through pipelines to form the thermal management system, and the pipelines between the functional components are flowing paths of fluid. It is a technical problem to provide a fluid management device and a thermal management system, to optimize the thermal management system.

SUMMARY

An object of the present application is to provide a fluid management device and a thermal management system to solve the above problems.

A fluid management device is provided according to an embodiment of the present application. The fluid management device includes a fluid management module, a connector and a fluid management component, the fluid management module is fixedly connected or limitedly connected to the connector, the connector includes a mounting portion, the mounting portion has a mounting hole, and at least part of the fluid management component is arranged in the mounting hole; the fluid management device has a communication channel, at least part of the communication channel is located in the connector, the communication channel includes a first communication channel and a second communication channel, the fluid management component is configured to adjust an opening degree of the second communication channel, and the second communication channel includes a first sub-channel, a second sub-channel, and a third sub-channel;

the fluid management module includes at least one of a first fluid management module and a second fluid management module, the first fluid management module includes a first valve core, the fluid management module has a first throttling chamber, a first valve chamber and a first gas-liquid separation chamber, the first valve core is arranged in the first valve chamber, the first valve core is configured to allow the first throttling chamber to communicate the first valve chamber with the first gas-liquid separation chamber, and the first communication channel communicates with the first valve chamber;

the second fluid management module includes a second valve core, the fluid management module has a second throttling chamber, a second valve chamber and a second gas-liquid separation chamber, the second valve core is arranged in the second valve chamber, the second sub-channel communicates with the second valve chamber, and the second valve core is configured to allow the second throttling chamber to communicate the second valve chamber with the second gas-liquid separation chamber.

A thermal management system is provided according to another embodiment of the present application. The thermal management system includes a compressor, a fluid management device, a first heat exchanger, and a second heat exchanger, the fluid management device is the fluid management device described in the above solutions, the fluid management device includes a first opening, a second opening, a third opening, a fourth opening, a fifth opening, a fifth opening, a sixth opening, and a seventh opening, an outlet of the compressor communicates with the fifth opening, the first heat exchanger communicates the second opening with the first opening, the third opening communicates with a first inlet of the compressor, the second heat exchanger communicates the fourth opening with the seventh opening, and the sixth opening communicates with a second inlet of the compressor.

In the fluid management device and the thermal management system provided according to the embodiments of the present application, a fluid management module, a connector, and a fluid management component are provided. The fluid management module is fixedly connected or limitedly connected to the connector, and at least part of the fluid management component is arranged in the mounting hole. The fluid management device has a communication channel, at least part of the communication channel is located in the connector, and the communication channel includes a first communication channel and a second communication channel. The second communication channel includes a first sub-channel, a second sub-channel, and a third sub-channel, and the fluid management component is configured to adjust the opening degree and/or opening-closing of the second communication channel. The second sub-channel communicates with the second valve chamber of the second fluid management module, and the first communication channel communicates with the first valve chamber of the first fluid management module. In this way, pipeline connections between functional components can be relatively reduce, which is beneficial to optimization of the thermal management system.

DETAILED DESCRIPTION OF EMBODIMENTS

Figure 1:
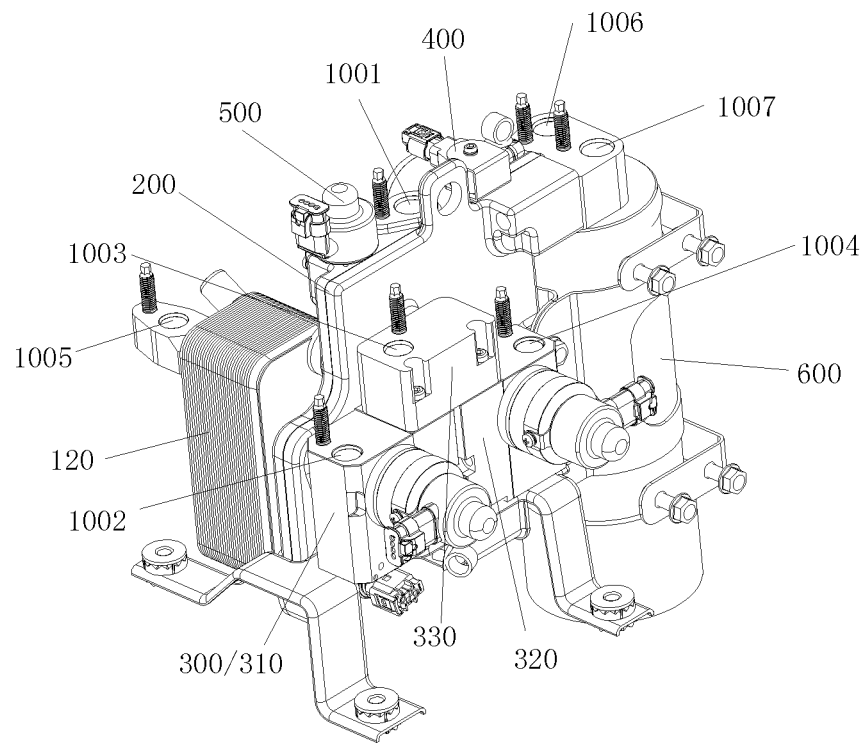
FIG. 1 is a three-dimensional structural schematic view of a fluid management device according to a first embodiment of the present application from a perspective.
Figure 2:
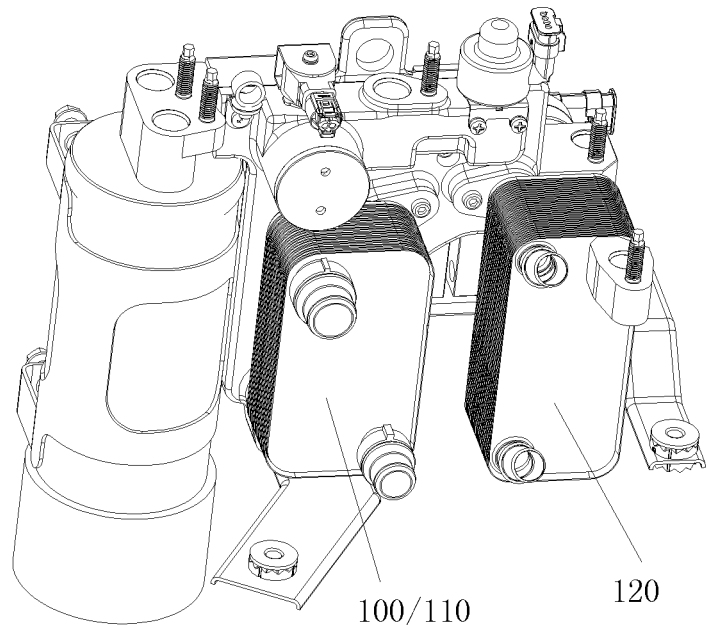
FIG. 2 is a three-dimensional structural schematic view of the fluid management device in FIG. 1 from another perspective.
Figure 3:
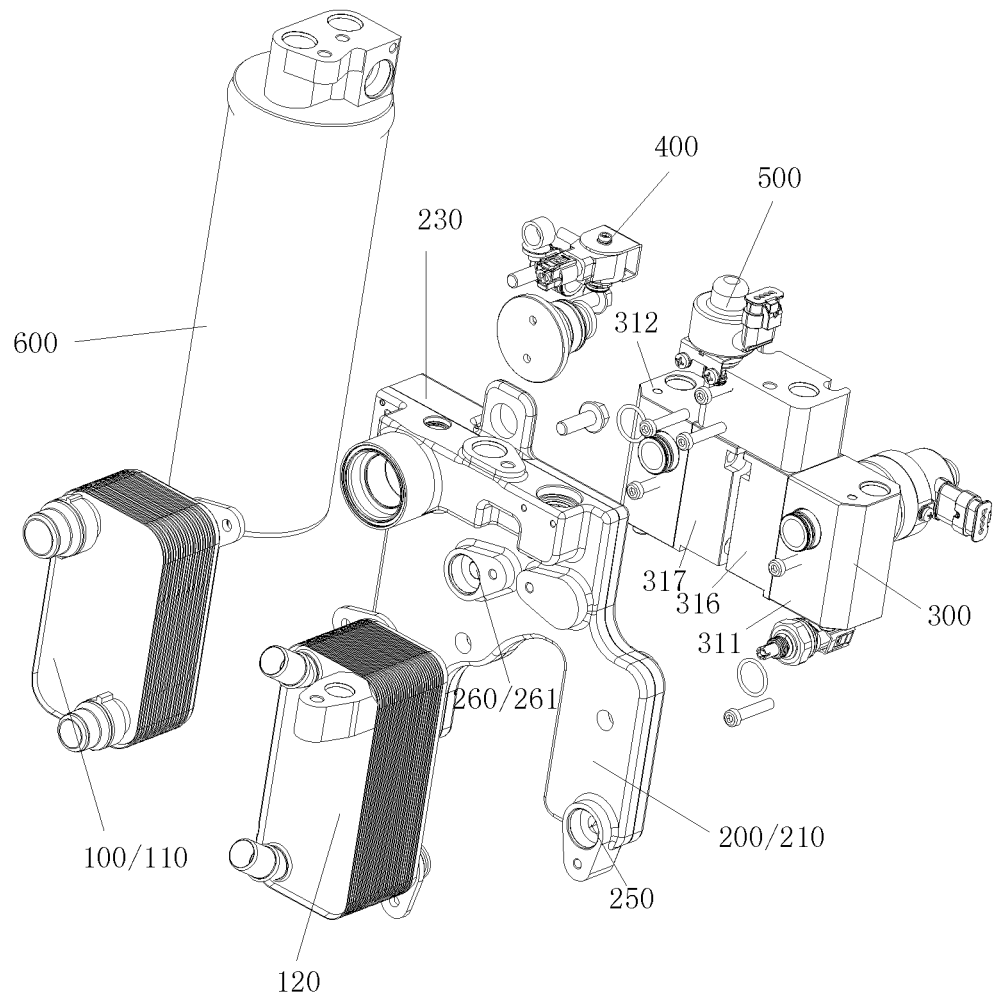
FIG. 3 is an exploded structural schematic view of the fluid management device in FIG. 1 from a perspective.
Figure 4:
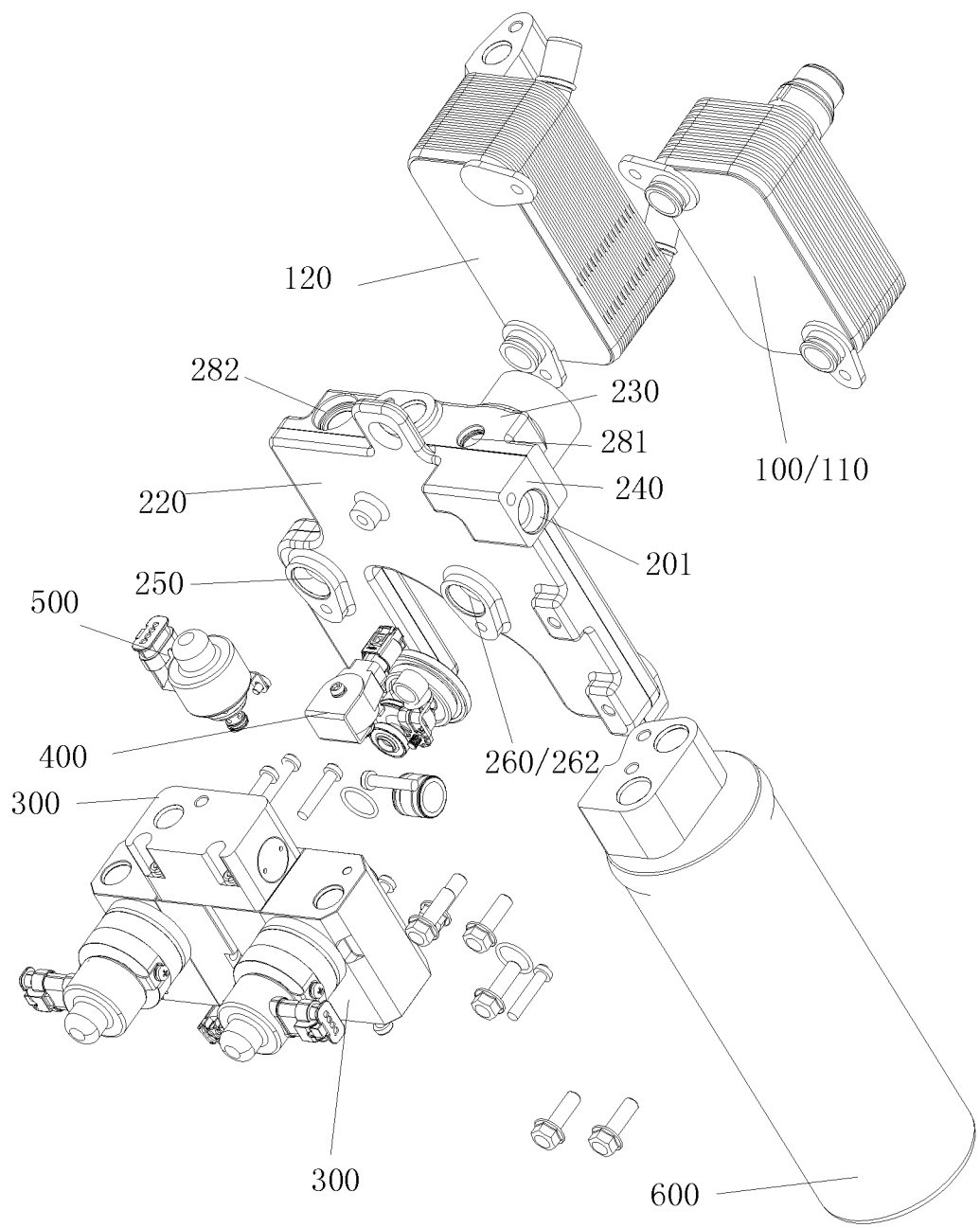
FIG. 4 is an exploded structural schematic view of the fluid management device in FIG. 1 from another perspective.
Figure 5:
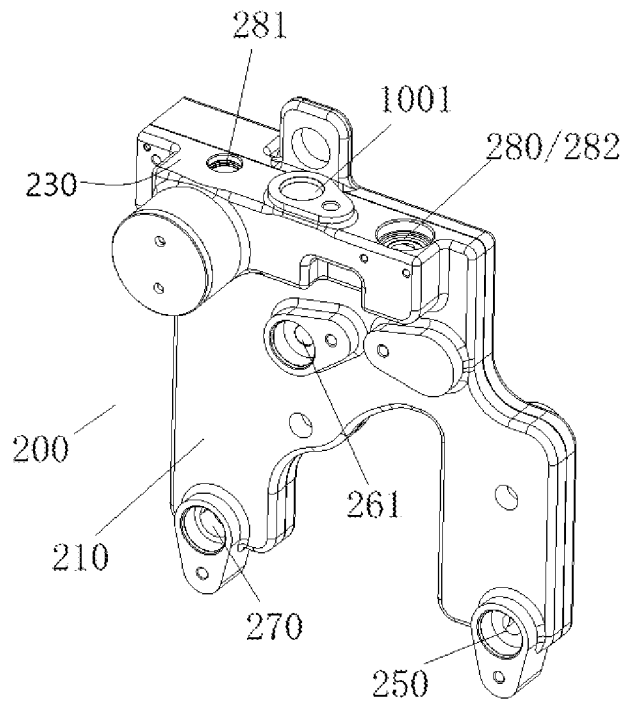
FIG. 5 is a three-dimensional structural schematic view of a connector in FIG. 1 from a perspective.
Figure 6:
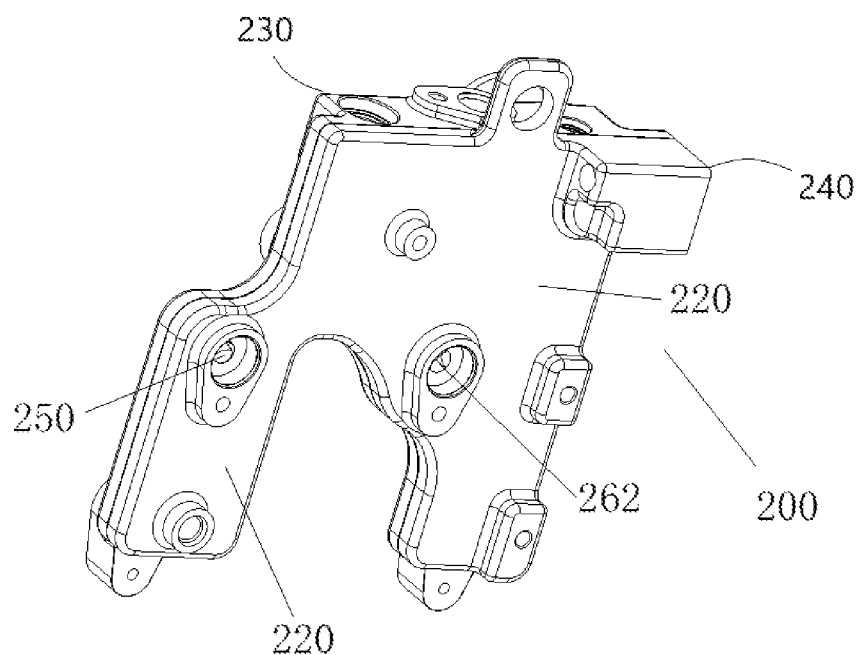
FIG. 6 is a three-dimensional structural schematic view of a connector in FIG. 4 from another perspective.
Figure 7:
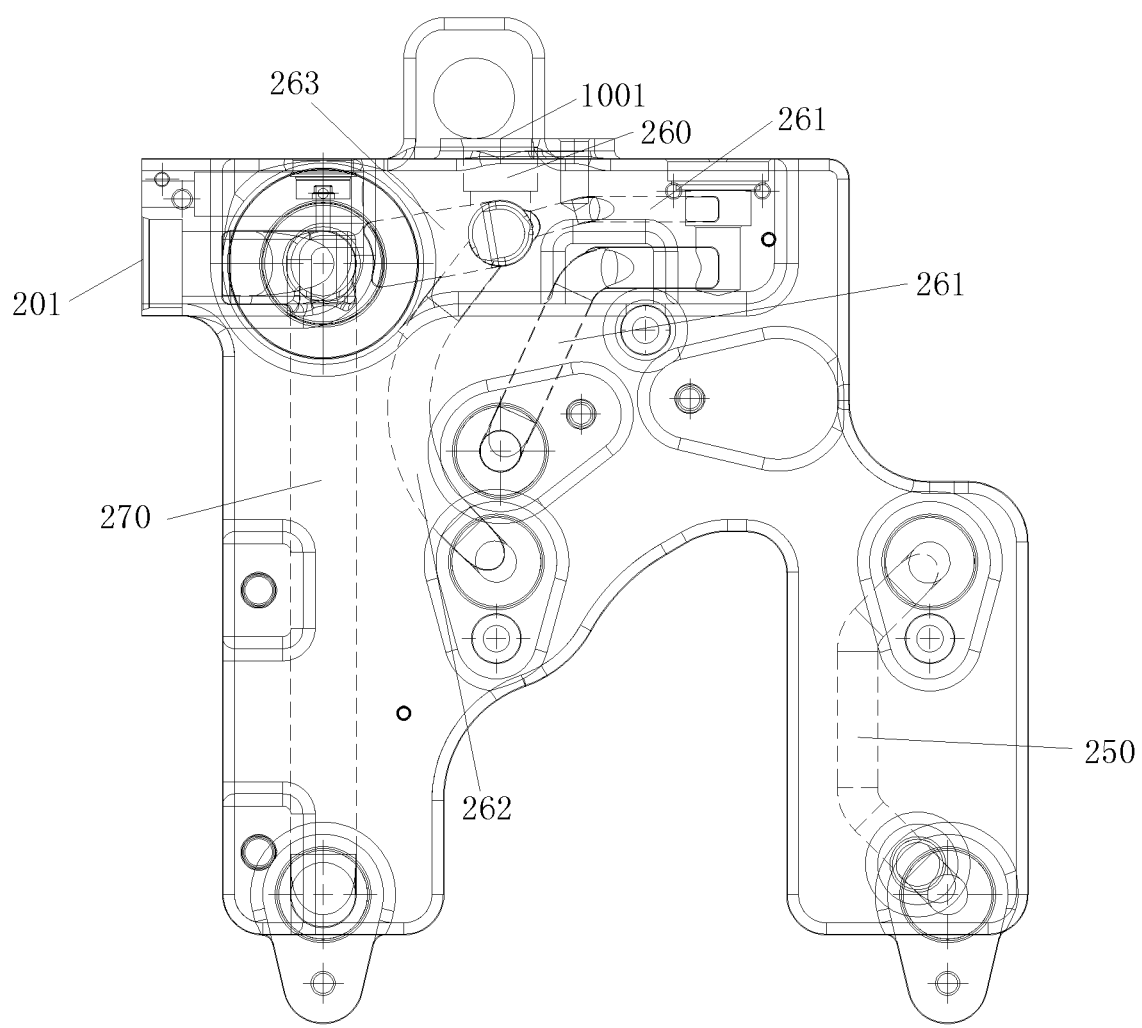
FIG. 7 is a perspective structural schematic view of the connector in FIG. 5.
Figure 8:
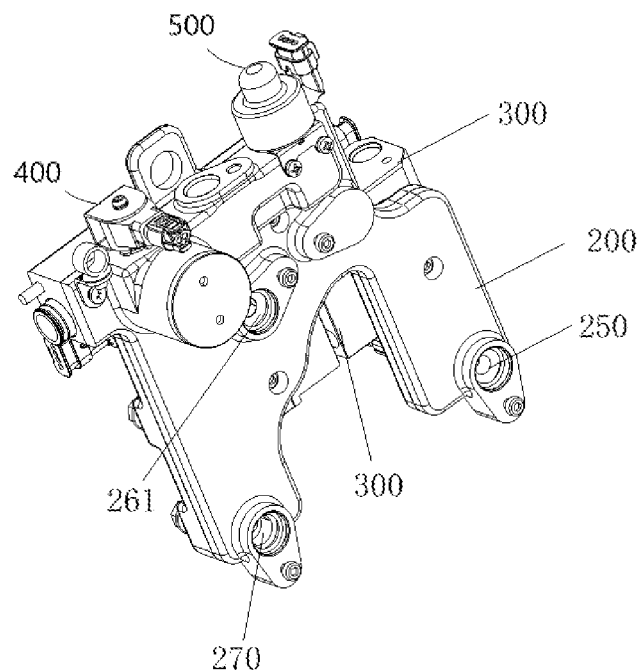
FIG. 8 is a three-dimensional structural schematic view of a fluid management device according to a second embodiment of the present application from a perspective.

A fluid management device according to technical solutions of the present application may have multiple embodiments, at least one embodiment can be applied to a vehicle thermal management system, and at least one embodiment can be applied to other thermal management systems such as a household thermal management system or a commercial thermal management system. A fluid management device applicable to a vehicle thermal management system is described hereinafter as an example with reference to the drawings. The fluid is a refrigerant, including R134a or $CO_2$ or other refrigerants.

Referring to FIGS. 1 to 11, the fluid management device 10 includes a fluid management component, a fluid management module 300, and a connector 200. The fluid management module 300 is fixedly connected or limitedly connected to the connector 200. The connector 200 includes a mounting portion 280, the mounting portion 280 has a mounting hole, and at least part of the fluid management component is arranged in the mounting hole. In the embodiment, the fluid management component includes a throttling unit 500 and a valve unit 400; correspondingly, the mounting portion 280 includes a first mounting portion and a second mounting portion. The first mounting portion has a first mounting hole 281, and the second mounting portion has a second mounting hole 282. At least part of the valve unit 400 is arranged in the first mounting hole 281, and the valve unit 400 is fixedly connected or limitedly connected to the first mounting portion; at least part of the throttling unit 500 is arranged in the second mounting hole 282; and the throttling unit 500 is fixedly connected or limitedly connected to the second mounting portion. The fluid management device 10 has a communication channel, and at least part of the communication channel is located in the connector 200. The fluid management component can adjust an opening degree of a second communication channel. Specifically, the communication channel includes a first communication channel 250 and the second communication channel 260. The second communication channel 260 includes a first sub-channel 261, a second sub-channel 262, and a third sub-channel 263. A wall of the second mounting portion is provided with an opening, and the opening of the second mounting portion communicates with the first sub-channel 261. The throttling unit 500 can adjust an opening degree of the first sub-channel 261. A wall of the first mounting portion is provided with an opening, and the opening of the first mounting portion communicates with the third sub-channel 263. The valve unit 400 can open and close the third sub-channel 263. The fluid management module 300 includes at least one of a first fluid management module 310 and a second fluid management module 320. The first fluid management module 310 includes a first valve core 313, the fluid management module 300 has a first throttling chamber 3131', a first valve chamber 3133, and a first gas-liquid separation chamber 3161, and the first valve core 313 is arranged in the first valve chamber 3133. The second fluid management module 320 includes a second valve core 315, the fluid management module 300 has a second throttling chamber 3151', a second valve chamber 3153, and a second gas-liquid separation chamber 3171, and the second valve core 315 is arranged in the second valve chamber 3153. The first communication channel 250 communicates with the first valve chamber 3133, and the second sub-channel 262 communicates with the second valve chamber 3153. The fixed connection or limited connection mentioned here includes connection manners such as welding, bonding, or bolted connection. The fluid management module 300, the throttling unit 500, and the valve unit 400 are fixedly connected or limitedly connected to the connector 200. The fluid management device 10 has the first communication channel 250 communicating with the first fluid management module 310, the fluid management device 10 has the second sub-channel 262 communicating with the second fluid management module 320, the valve unit 400 can open and close the third sub-channel 263, and the throttling unit 500 can adjust the opening degree of the first sub-channel 261. In this embodiment, the fluid management device 10 includes the valve unit 400 and the throttling unit 500, and the fluid management module 300 includes the first fluid management module 310 and the second fluid management module 320. During operation, the fluid management device 10 includes a first working mode and a second working mode. In the first working mode, the first valve core 313 allows the first throttling chamber 3131' to communicate the first valve chamber 3133 with the first gas-liquid separation chamber 3161, and the valve unit 400 opens the third sub-channel 263. In the second working mode, the second valve core 315 allows the second throttling chamber 3151' to communicate the second valve chamber 3153 with the second gas-liquid separation chamber 3171, and the valve unit 400 closes the third sub-channel 263. The communication channel is arranged in the connector 200, which is beneficial to preventing internal leakage and also facilitates the miniaturization of the fluid management device 10. The first valve core 313 and the second valve core 315 may be collectively referred to as the valve core, the first valve chamber 3133 and the second valve chamber 3153 may be collectively referred to as the valve chamber, and the first gas-liquid separation chamber 3161 and the second gas-liquid separation chamber 3171 may be collectively referred to as the gas-liquid separation chamber. In other embodiments, the fluid management component may also include a valve unit or a throttling unit, correspondingly, the mounting portion has a first mounting hole corresponding to the valve unit, or the mounting portion has a second mounting hole corresponding to the throttling unit. The opening degree referred herein includes two situations, where one situation is: the opening degree is 0, between 0 and 100%, and 100%; and the other situation is: the opening degree is between 0 and 100%.

Referring to FIGS. 3 to 6 and 9 to 11, the fluid management device includes a block. In a specific embodiment, the block includes a first block 311, a second block 316, a third block 312, and a fourth block 317. The first fluid management module 310 includes the first block 311 and the second block 316, the first block 311 is fixedly connected or limitedly connected to the second block 316, and the first block 311 is fixedly connected or limitedly connected to the connector 200. In this embodiment, the connector 200 is connected to the first block 311 through a bolted connection, and the first block 311 has an opening facing the connector 200. The first communication channel 250 communicates with the first valve chamber 3133. The first valve chamber 3133 is located in the first block 311, at least part of the first gas-liquid separation chamber 3161 is located in the second block 316, the first fluid management module 310 has a first channel 3162, at least part of the first channel 3162 is located in the second block 316, the first channel 3162 communicates with the first gas-liquid separation chamber 3161, and the first channel 3162 has an opening facing the first valve core 313. The first valve core 313 has a first groove 3131, and the first groove 3131 is matched with a valve seat of the first fluid management module 310 to form the first throttling chamber 3131'. The first valve core 313 is spherical or quasi-spherical or cylindrical. The second fluid management module 320 includes the third block 312 and the fourth block 317, the third block 312 is fixedly connected or limitedly connected to the fourth block 317, the third block 312 is fixedly connected or limitedly connected to the connector 200, and the connector 200 is connected to the third block 312 through a bolted connection. The third block 312 has an opening facing the connector 200, the second sub-channel 262 communicates with the second valve chamber 3153, and the second valve chamber 3153 is located in the third block 312. At least part of the second gas-liquid separation chamber 3171 is located in the fourth block 317. The first fluid management module 310 has a second channel 3172, at least part of the second channel 3172 is located in the fourth block 317, and the second channel 3172 communicates with the second gas-liquid separation chamber 3171. The second channel 3172 has an opening facing the second valve core 315. The second valve core 315 has a second groove 3151, and the second groove 3151 is matched with a valve seat of the second fluid management module 320 to form the second throttling chamber 3151'. The second valve core 315 is spherical or quasi-spherical or cylindrical. In this embodiment, during operation of the fluid management device 10, the refrigerant throttled by the first throttling chamber 3131' enters the first gas-liquid separation chamber 3161 through the first channel 3162, and then the refrigerant is rotated in a centrifugal manner in the first gas-liquid separation chamber 3161. Similarly, the refrigerant throttled by the second throttling chamber 3151' enters the second gas-liquid separation chamber 3171 through the second channel, and then the refrigerant is rotated in a centrifugal manner in the second gas-liquid separation chamber 3171. In other embodiments, the gas-liquid separation of the fluid management module 300 may also be implemented in other forms, which is not described in detail. In addition, the fluid management module 300 has a first gas channel 3163 and a first liquid channel 3164, to facilitate discharge of the refrigerant from the first fluid management module 310 after gas-liquid separation. The fluid management module 300 has a second gas channel 3173 and a second liquid channel 3174, to facilitate discharge of the refrigerant from the second fluid management module 320 after gas-liquid separation.

During the operation of the fluid management device 10, in the first working mode, the first valve core 313 allows the first throttling chamber 3131' to communicate the first valve chamber 3133 with the first gas-liquid separation chamber 3161; gaseous refrigerant leaves the fluid management device 10 through the first gas channel 3163, and relatively liquid refrigerant leaves the fluid management device 10 through the first liquid channel 3164; the valve unit 400 opens the third sub-channel 263, the throttling unit 500 closes the second sub-channel 262, and the second valve core 315 blocks communication between the second valve chamber 3153 and the second gas-liquid separation chamber 3171. In the second working mode, the first valve core 313 blocks communication between the first valve chamber 3133 and the first gas-liquid separation chamber 3161, the second valve core 315 allows the second throttling chamber 3151' to communicate the second valve chamber 3153 with the second gas-liquid separation chamber 3171, and the valve unit 400 closes the third sub-channel 263; the gaseous refrigerant leaves the fluid management device 10 through the second gas channel 3173, and the relatively liquid refrigerant leaves the fluid management device 10 through the second liquid channel 3174; the throttling unit 500 may be opened to throttle and depressurize the refrigerant in the first sub-channel 261, or the throttling unit 500 may not be opened. Further, the first valve core 313 has a first through channel 3132, and the first through channel 3132 has at least two openings in an outer wall of the first valve core 313. When the fluid management device 10 is in the second working mode, the first valve core 313 allows the first through channel 3132 to communicate the first valve chamber 3133 with an outlet of the first fluid management module 310, i.e. a second opening 1002, the first valve core 313 blocks communication between the first valve chamber 3133 and the first gas-liquid separation chamber 3161. The second communication channel 260 is an inlet channel of the fluid management device 10, and the second communication channel 260 has an opening at the connector, i.e. a first opening 1001, that is, the first sub-channel 261, the second sub-channel 262 and the third sub-channel 263 communicate with the first opening 1001. Similarly, the second valve core 315 has a second through channel 3152, and the second through channel 3152 has at least two openings in an outer wall of the second valve core 315. The second valve core 315 can allow the second through channel 3152 to communicate the second valve chamber 3153 with an outlet of the second fluid management module 320, i.e. a fourth opening 1004.

The first fluid management module 310 includes a first control portion 318. During operation of the first fluid management module 310, the first control portion 318 can drive the first valve core 313 to rotate. The first control portion 318 includes a first valve stem drivingly connected to the first valve core 313. The first fluid management module 310 includes a second control portion 321, and the second control portion 321 includes a second valve stem drivingly connected to the second valve core 315. Correspondingly, the first block 311 includes a first valve stem hole portion, the first valve stem hole portion has a first valve stem hole, part of the first valve stem is arranged in the first valve stem hole, and the first valve stem and the first valve stem hole portion are dynamically sealed. Similarly, the third block 312 includes a second valve stem hole portion, the second valve stem hole portion has a second valve stem hole, part of the second valve stem is arranged in the second valve stem hole, and the second valve stem and the second valve stem hole portion are dynamically sealed.

Referring to FIGS. 1 to 4, the fluid management device 10 includes a heat exchange module 100, and the heat exchange module 100 includes a plurality of stacked plates, where the stacking direction of the plates is defined as a first direction. The connector 200 includes a first side portion 210 and a second side portion 220. Along the first direction, the first side portion 210 is located at one side of the connector 200, the second side portion 220 is arranged on the other side, which is opposite to the one side, of the connector 200, and the side where the first side portion 210 is located and the other side where the second side portion 220 is located are different sides of the connector 200. The heat exchange module 100 is fixedly connected or limitedly connected to the first side portion 210, and the block of the fluid management module 300 is fixedly connected or limitedly connected to the second side portion 220. The heat exchange module 100 may include at least one of a first heat exchange module 120 and a second heat exchange module 110. In the embodiment, the heat exchange module 100 includes the second heat exchange module 110 and the first heat exchange module 120, and both the first heat exchange module 120 and the second heat exchange module 110 are plate heat exchangers. The connector 200 has a third communication channel 270. The first heat exchange module 120 has a first flow channel and a second flow channel, and the second heat exchange module 110 also has a first flow channel and a second flow channel. The first communication channel 250 has an opening, facing the first heat exchange module 120, in the first side portion 210, the first flow channel of the first heat exchange module 120 communicates with the first communication channel 250, the first communication channel 250 has an opening, facing the first block 311, in the second side portion 220, and the first communication channel 250 communicates with the first valve chamber 3133. In this way, the first flow channel of the first heat exchange module 120 communicates with the first valve chamber 3133 through the first communication channel 250. The first sub-channel 261 has an opening, facing the second heat exchange module 110, in the first side portion 210, the first flow channel of the second heat exchange module 110 communicates with the first sub-channel 261, the third communication channel 270 has an opening, facing the second heat exchange module 110, in the first side portion 210, and the first flow channel of the second heat exchange module 110 communicates with the third communication channel 270, in other words, the first sub-channel 261 communicates with the third communication channel 270 through the first flow channel of the second heat exchange module 110. The second sub-channel 262 has an opening, facing the third block 312, in the second side portion 220, and the second sub-channel 262 communicates with the second valve chamber 3153. The fluid management module is located at one side of the connector 200, the heat exchange module 100 is located at the other side of the connector 200, the fluid management module 300 and the heat exchange module 100 are located at different sides of the connector 200, in this way, the size of the fluid management module can be decreased, the mass center of the fluid management device 10 is relatively close to the connector 200, and the fluid management device 10 is more stable. In addition, the heat exchange module and the fluid management module are located at different sides of the connector 200, which is also beneficial to avoiding the heat exchange module 100 from interfering with the fluid management module during heat exchange. In the embodiment, during operation of the fluid management device 10, the fluid in the first flow channel of the first heat exchange module 120 and the first flow channel of the second heat exchange module 110 is refrigerant, and the fluid in the second flow channel of the first heat exchange module 120 and the second flow channel of the second heat exchange module 110 is cooling liquid.

The connector 200 includes a third side portion 230 and a fourth side portion 240, the third side portion 230 and the fourth side portion 240 are located at two sides of the connector, and the third side portion 230 is located above the fourth side portion along a direction of gravity, so that part of the valve unit 400 and part of the throttling unit 500 are located above the third side portion 230. Along the first direction, the first side portion 210 is located at one side of the third side portion 230, and the second side portion 220 is located at the other side, opposite to the one side, of the third side portion 230. The first mounting hole 281 has an opening in a wall of the third side portion 230, and the second mounting hole 282 also has an opening in the wall of the third side portion 230. The connector 200 includes the fourth side portion 240, along the first direction, the first side portion 210 is located at one side of the fourth side portion 240, and the second side portion 220 is located at the other side, opposite to the one side, of the fourth side portion 240. The fluid management device 10 includes a gas-liquid separation portion 600, and the gas-liquid separation portion 600 is fixedly connected or limitedly connected to the fourth side portion 240. The gas-liquid separation portion 600 has a separation cavity, the third communication channel 270 has an opening, facing the gas-liquid separation portion 600, in the fourth side portion 240, and the third communication channel 270 communicates with the separation cavity. Specifically, the fluid management device 10 has a first port 201, and the first port 201 is located in the fourth side portion 240. The first port 201 communicates with the third sub-channel 263, the first port 201 communicates with the third communication channel 270, and the first port 201 faces the gas-liquid separation portion 600. In this way, the refrigerant entering the fluid management device 10 through the second communication channel 260 can enter the gas-liquid separation portion 600 through the valve unit 400, the refrigerant entering the fluid management device 10 through the second communication channel 260 can also enter the gas-liquid separation portion 600 through the throttling unit 500, the second heat exchange module 110 and the third communication channel 270, and the refrigerant entering the fluid management device 10 through the second communication channel 260 can enter the second valve chamber 3153 through the second sub-channel 262.

Referring to FIGS. 1 to 4, 6 to 8, and 11, the fluid management device 10 has the first opening 1001, the second opening 1002, a third opening 1003, the fourth opening 1004, a fifth opening 1005, a sixth opening 1006, and a seventh opening 1007. The fifth opening 1005 communicates with the first flow channel of the first heat exchange module 120. In the embodiment, the fifth opening 1005 is located in the first heat exchange module 120 or in a tube or a block fixedly connected or limitedly connected to the first heat exchange module 120. The first opening 1001 is located in the third side portion 230, and the first opening 1001 communicates with the second communication channel 260. The valve unit 400 can open and close a communication channel between the first opening 1001 and the separation cavity. The first opening 1001 can communicate with the first flow channel of the first heat exchange module 120 through the throttling unit 500, the first opening 1001 communicates with the second sub-channel 262, and the first opening 1001 can communicate with the second valve chamber 3153 through the second sub-channel 262. Of course, the first opening 1001 may be located in a tube or a block fixedly connected or limitedly connected to the connector 200, which is not described in detail. The second opening 1002 is located in the first block 311, and the first block 311 has a channel communicating the second opening 1002 with the first valve chamber 3133. The first valve core 313 can allow the first throttling chamber 3131' or the first through channel 3132 to communicate the first valve chamber 3133 with the second opening 1002. In the embodiment, the first liquid channel 3164 also communicates with the second opening 1002, and the liquid refrigerant obtained after gas-liquid separation by the first gas-liquid separation chamber 3161 can flow out of the fluid management device 10 through the second opening 1002. The fourth opening 1004 is located in the third block 312, and the third block 312 has a channel communicating the second valve chamber 3153 with the fourth opening 1004. The first valve core 313 can allow the second throttling chamber 3151' or the second through channel 3152 to communicate the second valve chamber 3153 with the fourth opening 1004, and the second liquid channel 3174 also communicates with the fourth opening 1004. The liquid refrigerant obtained after gas-liquid separation by the second gas-liquid separation chamber 3171 can flow out of the fluid management device 10 through the fourth opening 1004. The third opening 1003 is located in the fluid management module 300, and the first gas channel 3163 and the second gas channel 3173 communicate with the third opening 1003. The gaseous refrigerant obtained after gas-liquid separation by the first gas-liquid separation chamber 3161 can be discharged from the fluid management device 10 through the third opening 1003, and the gaseous refrigerant obtained after gas-liquid separation by the second gas-liquid separation chamber 3171 can be discharged from the fluid management device 10 through the third opening 1003. The seventh opening 1007 is an inlet of the gas-liquid separation portion 600, and the sixth opening 1006 is an outlet of the gas-liquid separation portion 600. In the embodiment, both the sixth opening 1006 and the seventh opening 1007 are located in the gas-liquid separation portion 600. In a more specific embodiment, along the direction of gravity, the first opening 1001, the second opening 1002, the third opening 1003, the fourth opening 1004, the fifth opening 1005, the sixth opening 1006, and the seventh opening 1007 face upward, which facilitates the connection between the fluid management device 10 and other components or pipe fittings in the thermal management system.

Figure 9:
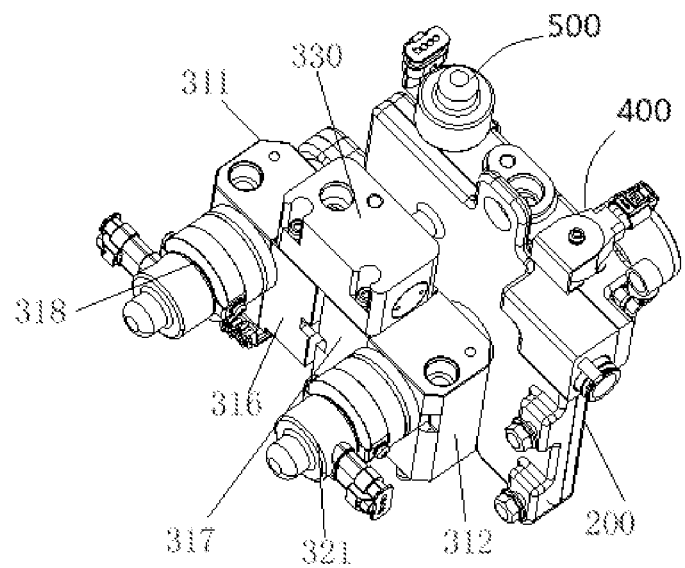
FIG. 9 is a three-dimensional structural schematic view of the fluid management device in FIG. 8 from another perspective.
Figure 10:
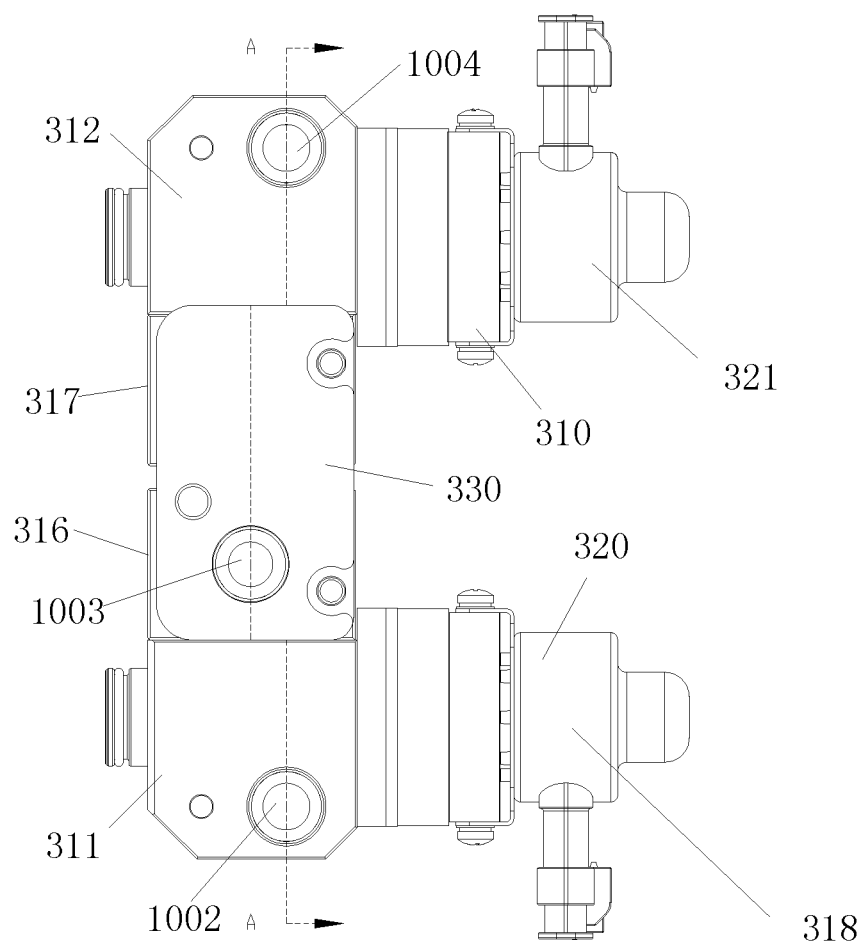
FIG. 10 is a top view of a fluid management module in FIG. 1.
Figure 11:
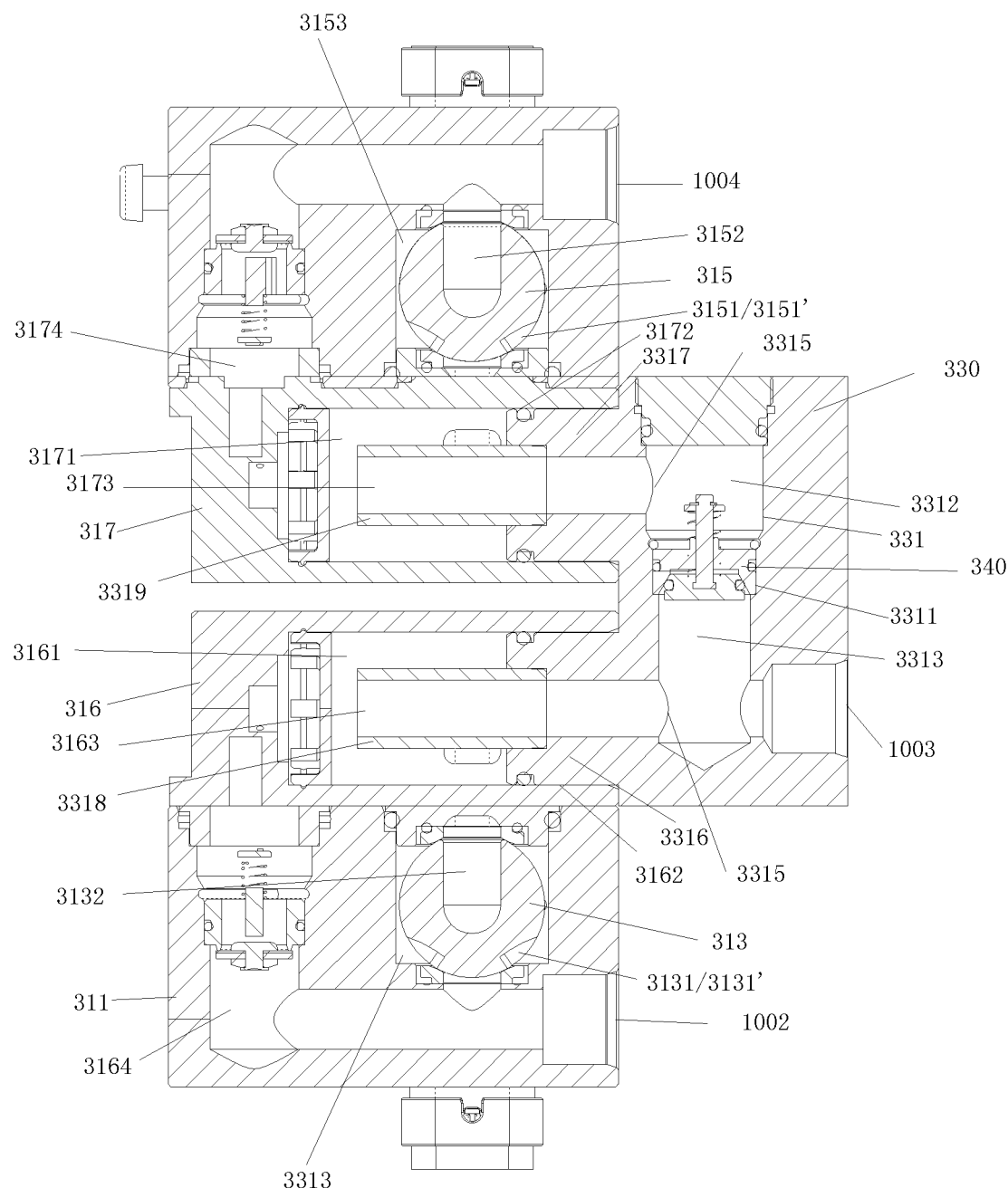
FIG. 11 is a cross-sectional schematic view taken along line A-A in FIG. 10.

Referring to FIGS. 9 to 11, the fluid management module 300 includes a communication portion 330, and the communication portion 330 is fixedly connected or limitedly connected to the block. The fixed connection here includes a connection manner that the communication portion 330 and the block being formed as a one-piece structure. In the embodiment, the block includes a fourth block 317 and a second block 316, the second block 316 is fixedly connected or limitedly connected to the communication portion 330, and the fourth block 317 is fixedly connected or limitedly connected to the communication portion 330. In other embodiments, the communication portion 330 may be of a one-piece structure with at least one of the second block 316 and the fourth block 317. The communication portion 330 includes an accommodation portion, the accommodation portion has an accommodation cavity, at least part of the valve component 340 is arranged in the accommodation cavity, and the valve component 340 is fixedly connected or limitedly connected to the accommodation portion. In the embodiment, at least part of the first gas channel 3163 is located in the communication portion 330, and at least part of the second gas channel 3173 is located in the communication portion 330. Specifically, the communication portion 330 has a first connection port, a first communication cavity 3312, and a second communication cavity 3313. The first communication cavity 3312 is a part of the second gas channel 3173, and the second communication cavity 3313 is a part of the first gas channel 3163. The first connection port is the third opening 1003 of the fluid management device 10 or communicates with the third opening 1003, the first communication cavity 3312 communicates with the second gas-liquid separation chamber 3171, and the second communication cavity 3313 communicates with the first gas-liquid separation chamber 3161. The valve component 340 can allow the first communication cavity 3312 to be in one-way communication with the second communication cavity 3313, and the first connection port communicates with the second communication cavity 3313. In this way, the gaseous refrigerant in the second gas-liquid separation chamber 3171 can flow out of the fluid management device 10 from the first connection port through the valve component 340. The gaseous refrigerant in the first gas-liquid separation chamber 3161 can flow out of the fluid management device 10 from the first connection port, and cannot enter the second gas-liquid separation chamber 3171 due to the presence of the valve component 340. In the embodiment, along the direction of gravity, at least part of the communication portion 330 is located above the second block 316, and at least part of the communication portion 330 is located above the fourth block 317. The second block 316 is fixed to the communication portion 330 through a bolted connection, and the fourth block 317 is fixed to the communication portion 330 through a bolted connection. In this way, the fluid management device 10 has a common gas outlet, which can reduce the ports of the fluid management device and facilitate the connection between the fluid management device 10 and other components of the thermal management system. The fluid management device 10 is provided with the valve component 340, which can prevent gas in the first gas-liquid separation chamber 3161 from entering the second gas-liquid separation chamber 3171. In other embodiments, the second block 316 and the fourth block 317 are formed as a one-piece structure, and the communication portion 330 is fixedly connected or limitedly connected to one of the second block 316 and the fourth block 317.

The fluid management device 10 includes a first insertion portion 3316, a second insertion portion 3317, a first holding portion 3162, and a second holding portion 3172. The first insertion portion 3316 is arranged in a holding cavity of the first holding portion 3162, the first insertion portion 3316 is sealingly connected to the first holding portion 3162, the second insertion portion 3317 is arranged in a holding cavity of the second holding portion 3172, and the second insertion portion 3317 is sealingly connected to the second holding portion 3172. The first insertion portion 3316 has a channel communicating the second communication cavity 3313 with the first gas-liquid separation chamber 3161, and then the second communication cavity communicates with the first gas-liquid separation chamber. The second insertion portion 3317 has a channel communicating the first communication cavity 3312 with the second gas-liquid separation chamber 3171, and then the first communication cavity communicates with the second gas-liquid separation chamber. One of the first insertion portion 3316 and the first holding portion 3162 is located at the communication portion 330, and the other is located at the second block 316. One of the second insertion portion 3317 and the second holding portion 3172 is located at the communication portion 330, and the other is located at the fourth block 317. The fluid management device is provided with the insertion portions and the corresponding holding portions, which is convenient for the positioning of the communication portion during installation, and thereby facilitates the installation.

In a specific embodiment, the communication portion 330 includes the first insertion portion 3316 and the second insertion portion 3317, the first holding portion 3162 is located at the second block 316, and a second holding portion 3172 is located at the fourth block 317. The fluid management device 10 includes a first conduit portion 3318 and a second conduit portion 3319. A conduit opening of the first conduit portion 3318 faces away from the first insertion portion 3316, and a conduit opening of the second conduit portion 3319 faces away from the second insertion portion 3317. The first conduit portion 3318 and the first insertion portion 3316 are formed as a one-piece structure or the first conduit portion 3318 is fixedly connected or limitedly connected to the first insertion portion 3316. The second conduit portion 3319 and the second insertion portion 3317 are formed as a one-piece structure or the second conduit portion 3319 is fixedly connected or limitedly connected to the second insertion portion 3317. Part of the first gas channel 3163 is located in the first conduit portion 3318 and the first insertion portion 3316, and part of the second gas channel 3173 is located in the second conduit portion 3319 and the second insertion portion 3317.

In the embodiment, the valve component 340 is a one-way component, the communication portion 330 includes a first hole portion 331, at least part of the first communication cavity 3312 is located in the first hole portion 331, and at least part of the second communication cavity 3313 is located in the first hole portion 331. The first hole portion 331 includes an accommodation portion, and the accommodation portion is used to accommodate the valve component 340. The communication portion 330 has a first communication port 3314 and a second communication port 3315, and the first communication port 3314 is located in a wall of the first hole portion 331, the second communication port 3315 is located in the wall of the first hole portion, the first communication port 3314 communicates with the second gas-liquid separation chamber 3171, and the second communication port 3315 communicates with the first gas-liquid separation chamber 3161. Along an axis direction of the first hole portion 331, the first communication port 3314 is located at one side of the accommodation portion, and the second communication port 3315 is located at the other side of the accommodation portion. In other embodiments, the valve component 340 may be a solenoid valve or a ball valve, which is not described in detail. Compared with the solutions where the valve component 340 is a solenoid valve or a ball valve, the present embodiment has the advantages of convenient installation and low cost, and electric control is not required.

The fluid management device 10 includes a first fixing portion, a second fixing portion, a first matching portion, and a second matching portion. The first fixing portion is fixedly connected or limitedly connected to the first matching portion, and the second fixing portion is fixedly connected or limitedly connected to the second matching portion. In the embodiment, the communication portion 330 is fixed to the second block 316 through a bolted connection, the communication portion 330 is fixed to the fourth block 317 through a bolted connection, that is, the communication portion 330 of the fluid management module is fixedly connected to the second block 316 and the fourth block 317 respectively. In this way, the first fluid management module 310 and the second fluid management module 320 are fixedly connected through the communication portion 330, so that the communication portion 330 not only has a communication function, but also has a fixed connection function. One of the first fixing portion and the first matching portion is located in the communication portion 330, and the other is located at the second block 316. One of the second fixing portion and the second matching portion is located at the communication portion 330, and the other is located at the fourth block 317. In the embodiment, the first matching portion and the second matching portion are respectively located at the second block 316 and the fourth block 317, respectively.

In the first working mode of the fluid management device 10, the first valve core 313 communicates the first valve chamber 3133 with the first gas-liquid separation chamber 3161 through the first throttling chamber 3131', the valve component 340 blocks the communication between the second communication cavity 3313 and the first communication cavity 3312, the gaseous refrigerant in the first gas-liquid separation chamber 3161 flows out of the fluid management device 10 through the first connection port, and the first connection port is an outlet of the fluid management device 10. In the second working mode, the first valve core 313 blocks the communication between the first valve chamber 3133 and the first gas-liquid separation chamber 3161, the second valve core 315 communicates the second valve chamber 3153 with the second gas-liquid separation chamber 3171 through the second throttling chamber 3151', the valve component 340 allows the first communication cavity 3312 to be in one-way communication with the second communication cavity 3313, and the first connection port is an outlet of the fluid management device 10.

Of course, the fluid management device 10 may not be provided with the communication portion 330. The first gas channel 3163 has an outlet in the second block 316 or in a tube or a block connected to the second block 316, and the second gas channel 3173 has an outlet in the fourth block 317 or in a tube or a block connected to the fourth block 317.

Figure 12:
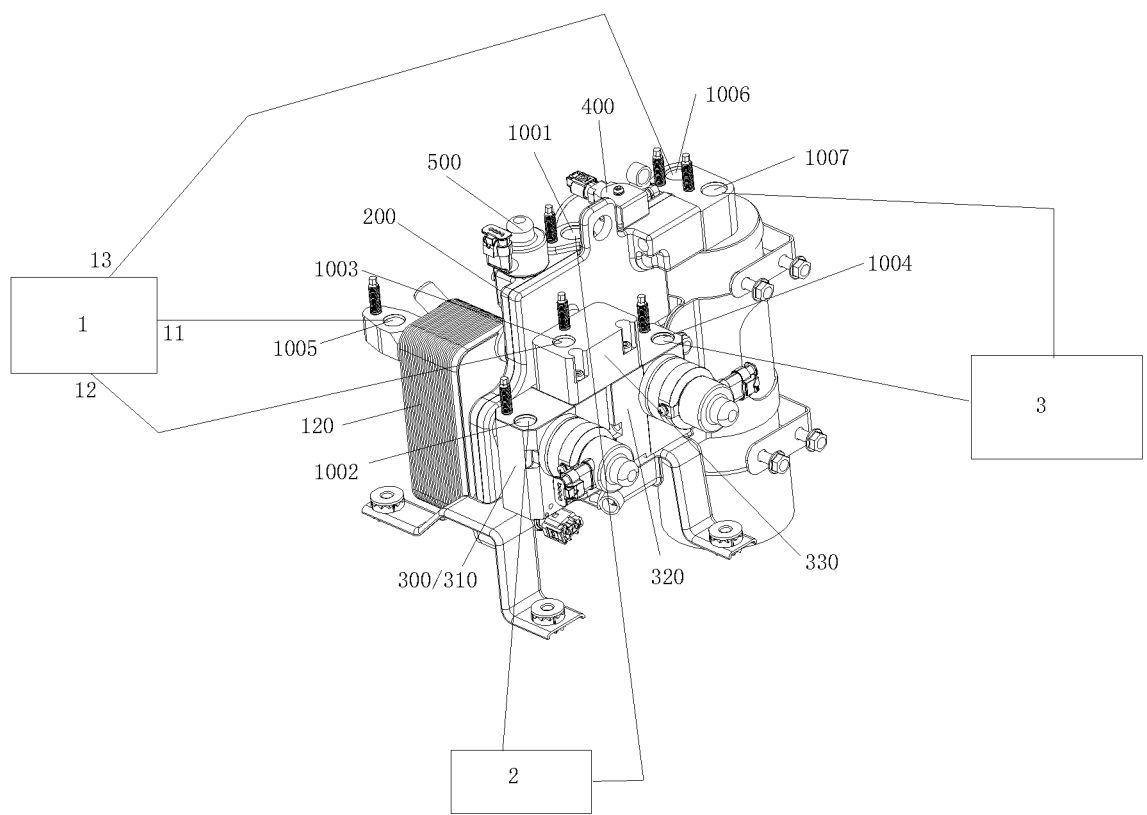
FIG. 12 is a schematic view showing connections of a thermal management system according to an embodiment of the present application.

A thermal management system is further provided according to an embodiment of the present application. As shown in FIG. 12, the thermal management system includes a compressor 1, a fluid management device 10, a first heat exchanger 2, and a second heat exchanger 3. The compressor 1 has an outlet 11, a first inlet 12, and a second inlet 13. The first inlet 12 is a relatively high pressure inlet, and the second inlet 13 is a relatively low pressure inlet. Specifically, the outlet 11 of the compressor 1 communicates with the fifth opening 1005, one port of the first heat exchanger 2 communicates with the second opening 1002, and another port of the first heat exchanger 2 communicates with the first opening 1001, in other words, the second opening 1002 can communicate with the first opening 1001 through the first heat exchanger 2. The third opening 1003 communicates with the first inlet 12 of the compressor 1. One port of the second heat exchanger 3 communicates with the fourth opening 1004, another port of the second heat exchanger 3 communicates with the seventh opening 1007, in other words, the fourth opening 1004 can communicate with the seventh opening 1007 through the second heat exchanger 3. The sixth opening 1006 communicates with the second inlet 13 of the compressor 1. The compressor 1, the first heat exchanger 2, and the second heat exchanger 3 respectively has an opening communicating with the fluid management device 10, in other words, the thermal management system communicates with the compressor 1, the first heat exchanger 2, and the second heat exchanger 3 through the fluid management device 10. The connection relationship of the thermal management system is relatively simple, and the installation steps can also be reduced.

In the embodiment, the first heat exchanger 2 is arranged in a front-end module of a vehicle, which is used for heat exchange with ambient air, that is, absorbing heat from the ambient air or releasing heat into the ambient air. The second heat exchanger 3 is arranged in an air-conditioning box for regulating the temperature of a passenger compartment. The thermal management system further includes a radiator and a first pump, the second flow channel of the first heat exchange module 120, the first pump and the radiator are in serial communication, and the radiator is arranged in the air-conditioning box for regulating the temperature of the passenger compartment. The thermal management system further includes a second pump and a battery cooler, the second flow channel of the second heat exchange module 110, the second pump, and the battery cooler are in serial communication, and the battery cooler is used to regulate the temperature of the battery.

The thermal management system includes a heating mode and a cooling mode. In the heating mode, the fluid management device 10 is in the first working mode. Specifically, the high-temperature and high-pressure refrigerant releases heat in the first heat exchange module 120, and then the refrigerant enters the first valve chamber 3133 of the first fluid management module 310 through the first communication channel 250 of the connector 200. The first valve core 313 allows the first throttling chamber 3131' to communicate the first valve chamber 3133 with the first gas-liquid separation chamber 3161. The refrigerant, after being throttled and depressurized, undergoes gas-liquid separation in the first gas-liquid separation chamber 3161, and then the gaseous refrigerant enters the first inlet 12 of the compressor 1 through the third opening 1003, the relatively liquid refrigerant enters the first heat exchanger 2 through the second opening 1002, and evaporates and absorbs heat in the first heat exchanger 2. The refrigerant flowing out of the first heat exchanger 2 enters the first opening 1001 of the fluid management device 10. The valve unit 400 opens the third sub-channel 263, the refrigerant enters the separation cavity through the third sub-channel 263, enters the second inlet 13 of the compressor 1 through the sixth opening 1006 to participate in the next cycle. The refrigerant after being throttled undergoes gas-liquid separation in the first gas-liquid separation chamber, and then the gaseous refrigerant enters the compressor 1, which has the effect of increasing gas and supplementing enthalpy for the entire thermal management system and thus can improve the performance of the thermal management system. In the cooling mode, the fluid management device 10 is in the second working mode. The high-temperature and high-pressure refrigerant discharged from the compressor 1 enters the first valve chamber 3133 of the first fluid management module 310 through the first heat exchange module 120 and the first communication channel 250. The first valve core 313 allows the first through channel 3132 to communicate the first valve chamber 3133 with the second opening 1002. The high-temperature and high-pressure refrigerant releases heat in the first heat exchanger 2, then the refrigerant enters the second sub-channel 262 of the connector 200 through the first opening 1001, and then enters the second valve chamber 3153. The second valve core 315 allows the second throttling chamber 3151' to communicate the second valve chamber 3153 with the second gas-liquid separation chamber 3171. The gaseous refrigerant enters the first inlet 12 of the compressor 1 through the third opening 1003, and the relatively liquid refrigerant enters the second heat exchanger 3 through the fourth opening 1004, and evaporates and absorbs heat in the second heat exchanger 3. The refrigerant enters the separation cavity through the seventh opening 1007, and then enters the second inlet 13 of the compressor 1 through the sixth opening 1006 to participate in the next cycle. The refrigerant after being throttled undergoes gas-liquid separation in the second gas-liquid separation chamber, and then the gaseous refrigerant enters the compressor 1, which has the effect of increasing gas and supplementing enthalpy for the entire thermal management system, and thus can improve the performance of the thermal management system. It can be known that the thermal management system of the embodiment has the function of increasing gas and supplementing enthalpy in both the cooling mode and the heating mode, and the performance of the thermal management system is improved.

In addition, the thermal management system further includes a battery cooling mode. In the battery cooling mode, the fluid management device 10 is in the second working mode. The high-temperature and high-pressure refrigerant discharged from the compressor 1 enters the first valve chamber 3133 of the first fluid management module 310 through the first heat exchange module 120 and the first communication channel 250. The first valve core 313 allows the first through channel 3132 to communicate the first valve chamber 3133 with the second opening 1002. The high-temperature and high-pressure refrigerant releases heat in the first heat exchanger 2, and then the refrigerant enters the connector 200 through the first opening 1001. At this time, the valve unit 400 closes the third sub-channel 263, and the second valve core 315 allows the second throttling chamber 3151' to communicate the second valve chamber 3153 with the second gas-liquid separation chamber 3171. The gaseous refrigerant enters the first inlet 12 of the compressor 1 through the third opening 1003. The relatively liquid refrigerant enters the second heat exchanger 3 through the fourth opening 1004, and evaporates and absorbs heat in the second heat exchanger 3. The refrigerant enters the separation cavity through the seventh opening 1007, and then enters the second inlet 13 of the compressor 1 through the sixth opening 1006 to participate in the next cycle. The throttling unit 500 is opened, the refrigerant is throttled and depressurized by the throttling unit 500, then enters the second heat exchange module 110, and the refrigerant evaporates and absorbs heat in the second heat exchange module 110. The refrigerant enters the separation cavity through the third communication channel 270, and then enters the second inlet 13 of the compressor 1 through the sixth opening 1006 to participate in the next cycle. In other embodiments, the second valve core 315 blocks the communication between the second valve chamber 3153 and the fourth opening 1004, and the second valve core 315 blocks the communication between the second valve chamber 3153 and the second gas-liquid separation chamber 3171. In this case, the second heat exchanger 3 does not participate in heat exchange.

It should be noted that the above embodiments are only used to illustrate the present application and are not intended to limit the technical solutions described in the present application. Although the specification has described the present application in detail with reference to the embodiments, it should be understand that, those skilled in the art may still make modifications or equivalent replacements to the present application, and all technical solutions and improvements thereof that do not deviate from the scope of the present application should be covered by the scope of the claims of the present application.

The invention claimed is:

1. A fluid management device, comprising a fluid management module and a connector, wherein
the fluid management module is fixedly connected or limitedly connected to the connector, the fluid management device has a communication channel, at least part of the communication channel is located in the connector; the communication channel comprises a first communication channel and a second communication channel, and the second communication channel comprises a first sub-channel, a second sub-channel and a third sub-channel;
the fluid management module comprises at least one of a first fluid management module and a second fluid management module, the first fluid management module comprises a first valve core, the first fluid management module has a first throttling chamber, a first valve chamber and a first gas-liquid separation chamber, the first valve core is arranged in the first valve chamber, the first valve core is configured to allow the first throttling chamber to communicate the first valve chamber with the first gas-liquid separation chamber, and the first communication channel communicates with the first valve chamber; the second fluid management module comprises a second valve core, the fluid management module has a second throttling chamber, a second valve chamber and a second gas-liquid separation chamber, the second valve core is arranged in the second valve chamber, the second sub-channel communicates with the second valve chamber, the second valve core is configured to allow the second throttling chamber to communicate the second valve chamber with the second gas-liquid separation chamber.

2. The fluid management device according to claim 1, comprising a fluid management component, wherein
the connector comprises a mounting portion, the mounting portion has a mounting hole, at least part of the fluid management component is arranged in the mounting hole, and the fluid management component is configured to adjust an opening degree of the second communication channel;
the fluid management module comprises a first fluid management module and a second fluid management module, the fluid management component comprises a valve unit, the mounting hole comprises a first mounting hole, at least part of the valve unit is arranged in the first mounting hole, and the valve unit is configured to open and close the third sub-channel;
the fluid management device has a first working mode and a second working mode, wherein
in the first working mode, the first valve core is configured to allow the first throttling chamber to communicate the first valve chamber with the first gas-liquid separation chamber, and the valve unit is configured to open the third sub-channel; and
in the second working mode, the second valve core is configured to allow the second throttling chamber to communicate the second valve chamber with the second gas-liquid separation chamber, and the valve unit is configured to close the third sub-channel.

3. The fluid management device according to claim 2, wherein
the fluid management component comprises a throttling unit, the mounting hole comprises a second mounting hole, at least part of the throttling unit is arranged in the second mounting hole, and the throttling unit is configured to adjust an opening degree of the first sub-channel;
the first valve core has a first through channel, in the second working mode, the first valve core is configured to allow the first through channel to communicate the first valve chamber with an outlet of the first fluid management module, the first valve core is configured to block communication between the first valve chamber and the first gas-liquid separation chamber, and the throttling unit is configured to open or close the first sub-channel.

4. The fluid management device according to claim 1, comprising a heat exchange module, wherein
the heat exchange module is fixedly connected or limitedly connected to the connector, the heat exchange module comprises at least one of a first heat exchange module and a second heat exchange module, each of the first heat exchange module and the second heat exchange module has a first flow channel, the first flow channel of the first heat exchange module communicates with the first communication channel, and the first flow channel of the second heat exchange module communicates with the first sub-channel.

5. The fluid management device according to claim 4, comprising the second heat exchange module, wherein
the connector has a third communication channel, the third communication channel communicates with the first flow channel of the second heat exchange module, the connector has a first port, and the third communication channel and the third sub-channel communicate with the first port; and
the fluid management device further comprises a gas-liquid separation portion, the gas-liquid separation portion is fixedly connected or limitedly connected to the connector, the first port faces the gas-liquid separation portion, the third communication channel communicates with a separation cavity of the gas-liquid separation portion, and the third sub-channel communicates with the separation cavity of the gas-liquid separation portion.

6. The fluid management device according to claim 1, wherein
the fluid management module comprises the first fluid management module and the second fluid management module, the fluid management device has a first opening, a second opening, a third opening and a fourth opening; the first opening is provided in the connector, and the first opening communicates with the second communication channel; the second opening is provided in the first fluid management module, the first valve core is configured to allow the first through channel or the first throttling chamber to communicate the first valve chamber with the second opening, and the first gas-liquid separation chamber communicates with the second opening; and the first gas-liquid separation chamber and the second gas-liquid separation chamber communicate with the third opening; and
the fourth opening is provided in the second fluid management module, the second valve core has a second through channel, the second valve core is configured to allow the second through channel or the second throttling chamber to communicate the second valve chamber with the fourth opening, and the second gas-liquid separation chamber communicates with the fourth opening.

7. The fluid management device according to claim 6, wherein
the heat exchange module comprises a first heat exchange module, and the fluid management device comprises a gas-liquid separation portion; the fluid management device further has a fifth opening, a sixth opening and a seventh opening; wherein
the fifth opening is provided in the first heat exchange module, the fifth opening communicates with the first flow channel of the first heat exchange module, the sixth opening and the seventh opening are provided in the gas-liquid separation portion, and the sixth opening and the seventh opening communicate with the separation cavity.

8. The fluid management device according to claim 1, further comprising a block, a communication portion, and a valve component, wherein
the block is fixedly connected or limitedly connected to the communication portion, and at least part of the first gas-liquid separation chamber and at least part of the second gas-liquid separation chamber are located in the block;
the communication portion comprises an accommodation portion, the accommodation portion has an accommodation cavity, at least part of the valve component is arranged in the accommodation cavity, and the valve component is fixedly connected or limitedly connected to the accommodation portion; the communication portion has a first connection port, a first communication cavity and a second communication cavity, wherein the first communication cavity communicates with the second gas-liquid separation chamber, the valve component is configured to allow the first communication cavity to be in one-way communication with the second communication cavity, the first connection port communicates with the second communication cavity, and the first gas-liquid separation chamber communicates with the second communication cavity.

9. The fluid management device according to claim 8, wherein
the block comprises a first block, a second block, a third block and a fourth block, the second block and the fourth block are of a one-piece structure or are separately provided, the first block is fixedly connected or limitedly connected to the second block, the first valve chamber is located in the first block, and at least part of the first gas-liquid separation chamber is located in the second block; the third block is fixedly connected or limitedly connected to the fourth block, and the second valve chamber is located in the third block, and at least part of the second gas-liquid separation chamber is located in the fourth block; and
the communication portion and at least one of the fourth block and the second block are of a one-piece structure; or, the communication portion is fixedly connected or limitedly connected to the second block, and the communication portion is fixedly connected or limitedly connected to the fourth block.

10. The fluid management device according to claim 9, further comprising a first insertion portion, a second insertion portion, a first holding portion and a second holding portion, wherein
the first insertion portion has a channel for communicating the second communication cavity with the first gas-liquid separation chamber, and the second insertion portion has a channel for communicating the first communication cavity with the second gas-liquid separation chamber; the first insertion portion is located in a holding cavity of the first holding portion, and the first insertion portion is sealingly connected to the first holding portion; the second insertion portion is located in a holding cavity of the second holding portion, and the second insertion portion is sealingly connected to the second holding portion; and
one of the first insertion portion and the first holding portion is located at the communication portion, and the other is located at the second block; one of the second insertion portion and the second holding portion is located at the communication portion, and the other is located at the fourth block.

11. The fluid management device according to claim 10, wherein
the communication portion comprises the first insertion portion and the second insertion portion, the first holding portion is located at the second block, and the second holding portion is located at the fourth block; and
the fluid management device further comprises a first conduit portion and a second conduit portion, wherein a conduit opening of the first conduit portion faces away from the first insertion portion, a conduit opening of the second conduit portion faces away from the second insertion portion, the first conduit portion and the first insertion portion are of a one-piece structure or are fixedly connected or limitedly connected with each other, and the second conduit portion and the second insertion portion are of a one-piece structure or are fixedly connected or limitedly connected with each other.

12. The fluid management device according to claim 9, wherein
the valve component is a one-way component, the communication portion comprises a first hole portion, at least part of the first communication cavity is located in the first hole portion, and at least part of the second communication cavity is located in the first hole portion; and
the first hole portion comprises an accommodation portion, the communication portion comprises a first communication port and a second communication port, the first communication port communicates with the second gas-liquid separation chamber, and the second communication port communicates with the first gas-liquid separation chamber; along an axis direction of the first hole portion, the first communication port is located at one side of the accommodation portion, the second communication port is located at the other side of the accommodation portion, and the first communication port and the second communication port are located at the different sides of the accommodation portion; and
along a direction of gravity, at least part of the communication portion is located above the block.

13. A thermal management system, comprising a compressor, a fluid management device, a first heat exchanger, and a second heat exchanger, wherein
the fluid management device is the fluid management device according to claim 1, the fluid management device comprises a first opening, a second opening, a third opening, a fourth opening, a fifth opening, a fifth opening, a sixth opening, and a seventh opening, an outlet of the compressor communicates with the fifth opening, the first heat exchanger communicates the second opening with the first opening, the third opening communicates with a first inlet of the compressor, the second heat exchanger communicates the fourth opening with the seventh opening, and the sixth opening communicates with a second inlet of the compressor.

14. The thermal management system according to claim 13, wherein
the fluid management device further comprises a throttling unit and a valve unit, and the thermal management system has a heating mode and a cooling mode; wherein
in the heating mode, the first valve core allows the first throttling chamber to communicate the first valve chamber with the first gas-liquid separation chamber, and the valve unit is configured to open the third sub-channel; and
in the cooling mode, the first valve core allows the first through channel to communicate the first valve chamber with the second opening, the first valve core is configured to block communication between the first valve chamber and the first gas-liquid separation chamber, the second valve core is configured to allow the second throttling chamber to communicate the second valve chamber with the second gas-liquid separation chamber, and the valve unit is configured to close the third sub-channel.

15. The thermal management system according to claim 14, wherein
the thermal management system has a battery cooling mode, in the battery cooling mode, the first valve core is configured to allow the first through channel to communicate the first valve chamber with the second opening, the valve unit is configured to close the third sub-channel, and the throttling unit is opened; and
the second valve core is configured to allow the second throttling chamber to communicate the second valve chamber with the second gas-liquid separation chamber; or, the second valve core is configured to block communication between the second valve chamber and the fourth opening, and the second valve core is configured to block communication between the second valve chamber and the second gas-liquid separation chamber.

16. The fluid management device according to claim 2, comprising a heat exchange module, wherein
the heat exchange module is fixedly connected or limitedly connected to the connector, the heat exchange module comprises at least one of a first heat exchange module and a second heat exchange module, each of the first heat exchange module and the second heat exchange module has a first flow channel, the first flow channel of the first heat exchange module communicates with the first communication channel, and the first flow channel of the second heat exchange module communicates with the first sub-channel.

17. The fluid management device according to claim 3, comprising a heat exchange module, wherein
the heat exchange module is fixedly connected or limitedly connected to the connector, the heat exchange module comprises at least one of a first heat exchange module and a second heat exchange module, each of the first heat exchange module and the second heat exchange module has a first flow channel, the first flow channel of the first heat exchange module communicates with the first communication channel, and the first flow channel of the second heat exchange module communicates with the first sub-channel.

18. The fluid management device according to claim 2, wherein
the fluid management module comprises the first fluid management module and the second fluid management module, the fluid management device has a first opening, a second opening, a third opening and a fourth opening; the first opening is provided in the connector, and the first opening communicates with the second communication channel; the second opening is provided in the first fluid management module, the first valve core is configured to allow the first through channel or the first throttling chamber to communicate the first valve chamber with the second opening, and the first gas-liquid separation chamber communicates with the second opening; and the first gas-liquid separation chamber and the second gas-liquid separation chamber communicate with the third opening; and
the fourth opening is provided in the second fluid management module, the second valve core has a second through channel, the second valve core is configured to allow the second through channel or the second throttling chamber to communicate the second valve chamber with the fourth opening, and the second gas-liquid separation chamber communicates with the fourth opening.

19. The fluid management device according to claim 2, further comprising a block, a communication portion, and a valve component, wherein
the block is fixedly connected or limitedly connected to the communication portion, and at least part of the first gas-liquid separation chamber and at least part of the second gas-liquid separation chamber are located in the block;
the communication portion comprises an accommodation portion, the accommodation portion has an accommodation cavity, at least part of the valve component is arranged in the accommodation cavity, and the valve component is fixedly connected or limitedly connected to the accommodation portion; the communication portion has a first connection port, a first communication cavity and a second communication cavity, wherein the first communication cavity communicates with the second gas-liquid separation chamber, the valve component is configured to allow the first communication cavity to be in one-way communication with the second communication cavity, the first connection port communicates with the second communication cavity, and the first gas-liquid separation chamber communicates with the second communication cavity.

20. The fluid management device according to claim 10, wherein
the valve component is a one-way component, the communication portion comprises a first hole portion, at least part of the first communication cavity is located in the first hole portion, and at least part of the second communication cavity is located in the first hole portion; and
the first hole portion comprises an accommodation portion, the communication portion comprises a first communication port and a second communication port, the first communication port communicates with the second gas-liquid separation chamber, and the second communication port communicates with the first gas-liquid separation chamber; along an axis direction of the first hole portion, the first communication port is located at one side of the accommodation portion, the second communication port is located at the other side of the accommodation portion, and the first communication port and the second communication port are located at the different sides of the accommodation portion; and along a direction of gravity, at least part of the communication portion is located above the block.

* * * * *